(12) United States Patent
Marshak et al.

(10) Patent No.: US 9,778,852 B1
(45) Date of Patent: Oct. 3, 2017

(54) AUTOMATED STORAGE TIERING BASED ON APPLICATION AWARENESS

(71) Applicant: EMC Corporation, Hopkinton, MA (US)

(72) Inventors: Marik Marshak, Newton, MA (US); Alexandr Veprinsky, Brookline, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 569 days.

(21) Appl. No.: 14/039,897

(22) Filed: Sep. 27, 2013

(51) Int. Cl.
*G06F 12/00* (2006.01)
*G06F 3/06* (2006.01)

(52) U.S. Cl.
CPC .......... *G06F 3/0611* (2013.01); *G06F 3/0655* (2013.01); *G06F 3/0689* (2013.01)

(58) Field of Classification Search
None
See application file for complete search history.

(56) References Cited

U.S. PATENT DOCUMENTS 8,230,192 B2 * 7/2012 Balasubramanian et al. .............................. 711/165

* cited by examiner

*Primary Examiner* — Baboucarr Faal
(74) *Attorney, Agent, or Firm* — Anderson Gorecki LLP; Holmes Anderson

(57) ABSTRACT

Predictors of future application activity/inactivity are used in combination with monitored data access activity to prompt movement of data between tiers of storage. The apparent amount of activity for data associated with an application that is expected to become active to be increased even before data associated with that application becomes active. Further, the apparent amount of activity for data associated with an application that has become inactive is rapidly decreased by overriding algorithms that control rate of change to counter thrashing.

15 Claims, 5 Drawing Sheets

AUTOMATED STORAGE TIERING BASED ON APPLICATION AWARENESS

CROSS-REFERENCE TO RELATED APPLICATIONS

NA

BACKGROUND OF THE INVENTION

Aspects of the disclosure are generally related to data storage subsystems which are accessed via a network, and more particularly to positioning data in tiers of a tiered storage system. Computer data is vital to the operations of many organizations. Consequently, systems have been developed to protect data and maintain data availability. Enterprise data storage arrays, for example, are used to maintain and protect relatively large data sets. An enterprise data storage subsystem includes at least one enterprise storage array which is accessed via a host device. The storage array typically includes multiple physical storage devices. Technologies such as RAID and remote site mirroring may be used to help maintain availability and avoid data loss. Further, the storage resources of the array may be organized into tiers based on performance in order to help provide both high performance and high capacity at a practical cost. Applications and devices generally access data in the storage array by sending IOs to the host device. The host device communicates with the storage array to Read or Write the corresponding data. If storage resources are organized in hierarchical tiers then data may be stored and moved between storage tiers based on IO activity. For example, data that is infrequently needed may be moved to a lower storage tier of less costly media with slower access time and data that is frequently needed may be moved to a higher storage tier of more costly media with faster access time.

SUMMARY OF THE INVENTION

In accordance with an aspect, a method comprises: in a data storage system including a host which runs a data processing application and a tiered storage array associated with the application, monitoring data access activity associated with the logical unit of storage; monitoring at least one indicator of activity of the application; and causing data to be moved between tiers of storage based on both data access activity and the indicator of activity of the application.

In accordance with another aspect, a computer program stored on a non-transitory computer readable medium comprises: in a data storage system including a host which runs a data processing application and a tiered storage array associated with the application, logic which monitors data access activity associated with the logical unit of storage; logic which monitors at least one indicator of activity of the application; and logic which causes data to be moved between tiers of storage based on both data access activity and the indicator of activity of the application.

In accordance with another aspect, an apparatus comprises: a host device which runs a data processing application; a tiered storage array associated with the application, the storage array including logic which monitors data access activity associated with the logical unit of storage; logic which monitors at least one indicator of activity of the application; and logic which causes data to be moved between tiers of storage based on both data access activity and the indicator of activity of the application.

Advantages can include improved performance. Growth and decay functions help to avoid thrashing that might otherwise occur if promotion and demotion decisions were based solely on monitored activity. However, growth and decay functions can contribute to poor application performance during initial application activity and cause data to occupy valuable higher tier storage resources for hours or days even when the associated application is inactive. These problems can create practical limitations for use of storage tiers with significantly different performance characteristics. In some cases an overload of a low storage tier may even create system-wide performance problems. Application awareness helps to overcome these problems by enabling apparent activity of data associated with an application that is expected to become active to be increased even before data associated with that application becomes active. Further, application awareness enables apparent activity of data associated with an application that has become inactive to be rapidly decreased. As a result, performance is improved and relatively greater differences in performance characteristics between highest and lowest tiers may become practical. Other features and advantages will become apparent in view of the detailed description and figures.

DETAILED DESCRIPTION

Figure 1:
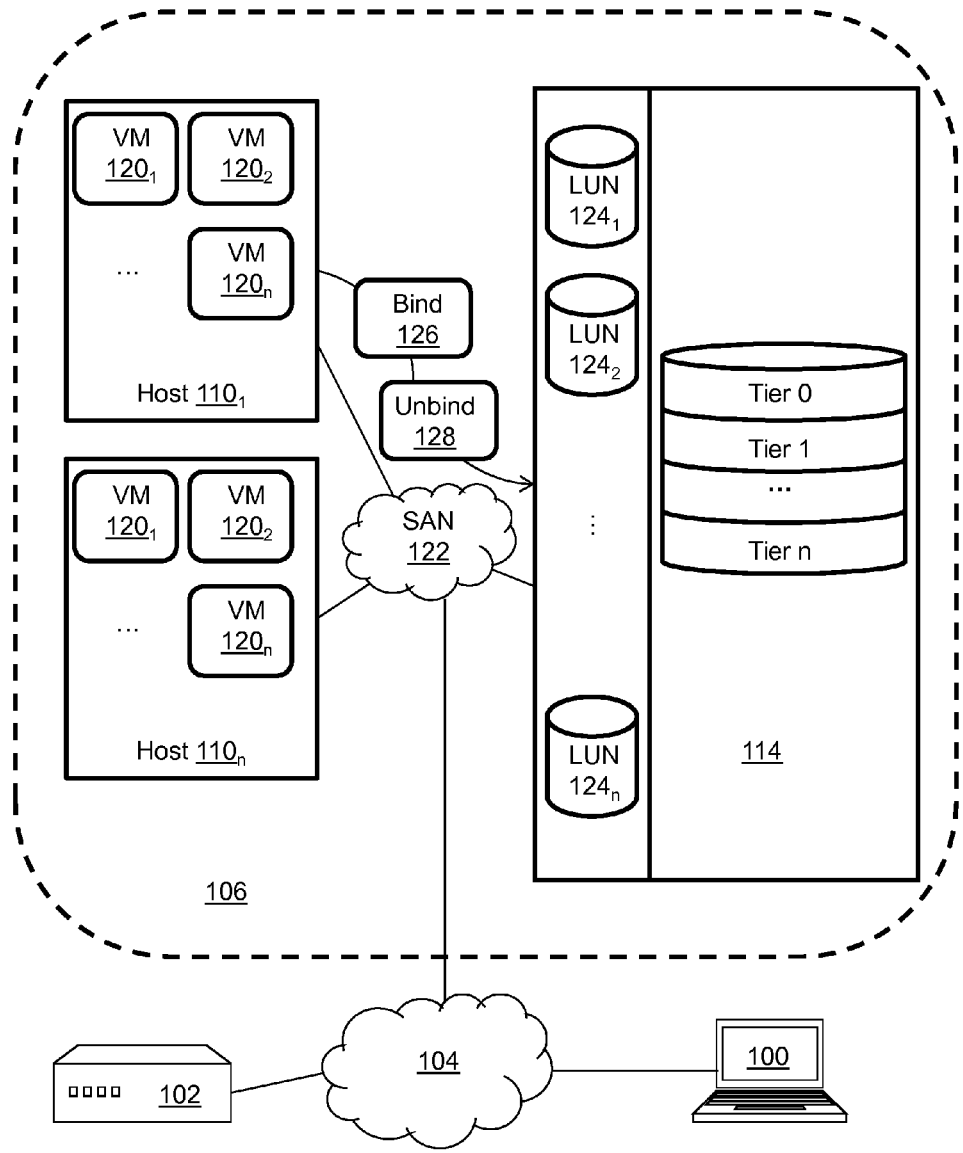
FIG. 1 illustrates a simplified network environment in which storage tiering is automated and based on actual activity and application awareness.

FIG. 1 illustrates a simplified network environment in which applications running on computer devices such as user terminal 100 and server 102 utilize a network 104 to access data maintained by a production site data storage subsystem 106. The data storage subsystem 106 includes multiple physical hosts $110_1$ through $110_n$ (collectively hosts 110) and at least one storage array 114. The hosts 110 and storage array 114 are in communication via a storage area network (SAN) 122, which may include various switching devices. The hosts 110 typically run data processing applications such as database applications and e-mail servers, just for example and without limitation. More particularly, each host instantiates multiple virtual machines $120_1$ through $120_n$ (collectively virtual machines 120), and each virtual machine typically supports one data processing application. The applications on the computer devices 100, 102 communicate with the data processing applications running on the virtual machines, and can prompt an IO request as a result of those communications. More particularly, a host prompts IOs on behalf of a data processing application by signaling to the storage array 114 in a format that can be processed by the storage array. For example, if the data processing application prompts the host to generate a Read IO request for a set of data then the host may generate a corresponding small computer system interface (SCSI) Read request and send that Read request to the storage array 114. The storage array responds by providing the data associated with the Read request to the host. The host provides the data to the data processing application on the virtual machine which prompted the Read IO. The data may also be sent from the host to the computer device which prompted the IO.

The storage array 114 is organized into different hierarchical tiers which are designated tier 0 through tier n in the illustrated example. A data storage system typically includes various logical constructs which represent data storage resources, but data is ultimately stored on physical storage devices. Different types of physical storage devices have different performance characteristics and different costs. In a tiered storage system each tier is typically associated with a particular type of physical storage device such that the entire tier has similar or identical performance characteristics. Consequently, different tiers are characterized by different levels of performance and different cost per unit of storage capacity. Physical storage devices which are characterized by relatively faster response times are generally more costly than devices characterized by relatively slower response times. The tiered storage system balances storage cost and storage performance by selectively storing data at the different tiers in a manner intended to achieve desired levels of overall system performance, cost and capacity. For example, and without limitation, the physical storage devices may include high-speed flash (EFD) arrays at tier 0, Fibre Channel arrays at tier 1, and SATA arrays at tier n. Data access may be monitored on a sub-LUN extent basis, where each extent may be associated with a contiguous area of storage of predetermined size. Tier 0 is used to store extents which are relatively active, i.e., "hot" in terms of apparent activity relative to other extents. Tier 0 is selected for hot extents because it exhibits the best access time. Tier 1 is used to store extents which are relatively less active, i.e., "warm" in terms of apparent activity. In particular, the next-highest ranked (after tier 0) extents of storage are selected for storage at tier 1. The remaining extents are stored at a tier lower than tier 1. In general there will be greater storage capacity at tier 2 than at tier 1, and greater storage capacity at tier 1 than at tier 0, etc. The number of tiers, types of storage devices used at the tiers, and capacity of the tiers is selected to achieve a particular performance, capacity and cost profile at the system level. A wide variety of storage devices and numbers of tiers might be utilized, and the illustrated example is simplified for ease of understanding so it should not be viewed as limiting the invention.

The physical storage devices of the storage array 114 are presented to the hosts as logical storage units (LUNs) 124₁ through 124ₙ, which the hosts may cause to be created or deleted. For example, an application running on a particular host or virtual machine may prompt creation of a LUN to support that host or virtual machine. The storage array maintains mappings between the LUNs and the physical storage devices, and each LUN may be tiered. Various techniques which support virtual storage for virtual machines are known, including but not limited to virtual machine disk format (VMDK), virtual machine file system (VMFS), and raw device mapping (RDM). VMDK and VMFS map to pools of LUNs, whereas RDM maps to a particular device. In particular, a RDM mapping file contains metadata to redirect disk accesses to a particular virtual device (e.g., LUN) or physical device. In order to activate an association between an application running on a virtual machine and an existing LUN, the host sends a bind command 126 to the storage array. In order to deactivate an association between an application on a virtual machine and an existing LUN the host sends an unbind command 128 to the storage array. Consequently, the bind and unbind commands can be indicative of whether the application running on the virtual machine will become active or inactive. It should be noted however that there may be other indicators of the onset of application activity and inactivity. As will be explained below, awareness of changes in the state of application activity can be used as indicators of activity for data associated with the application.

Figure 2:
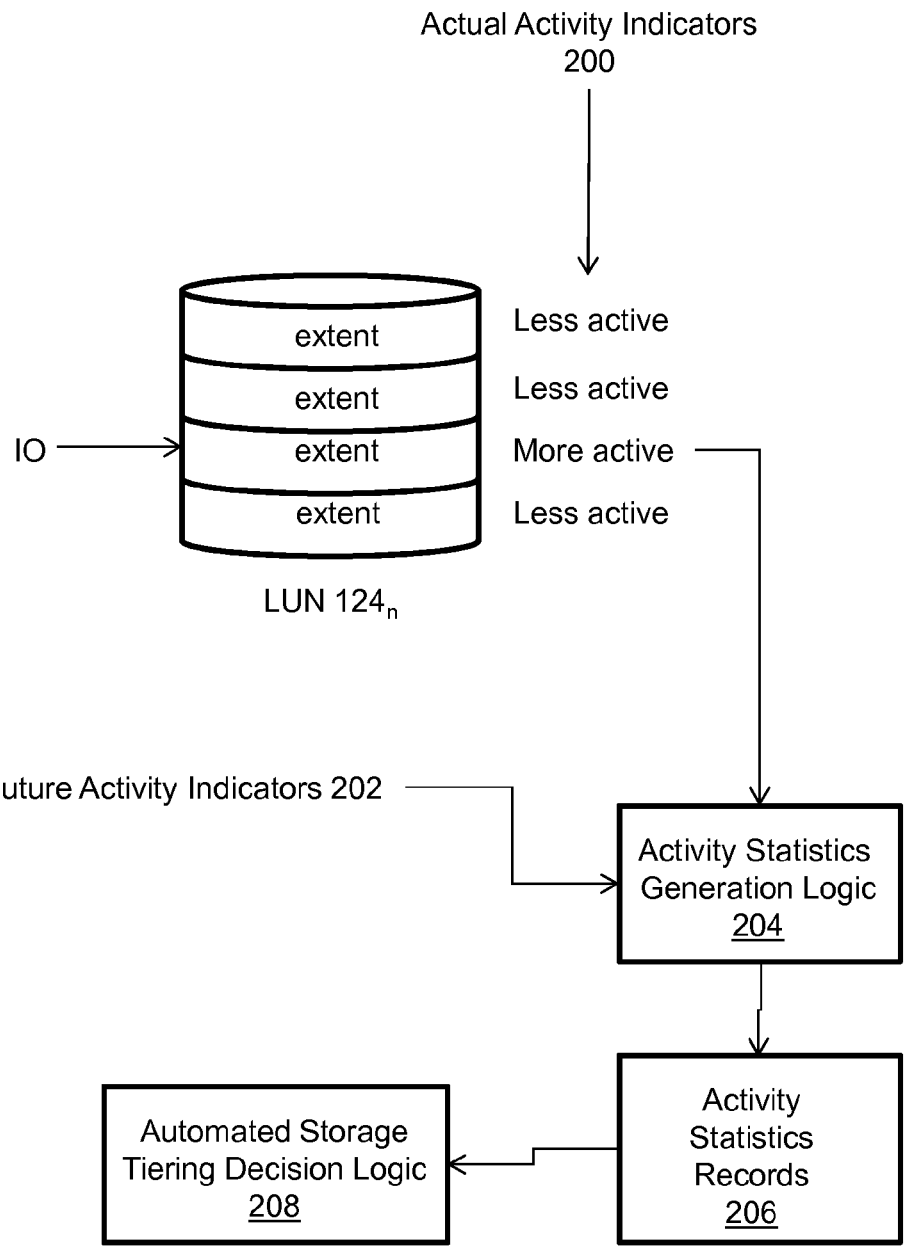
FIG. 2 illustrates generation of activity statistics for automated storage tiering.
Figure 3:
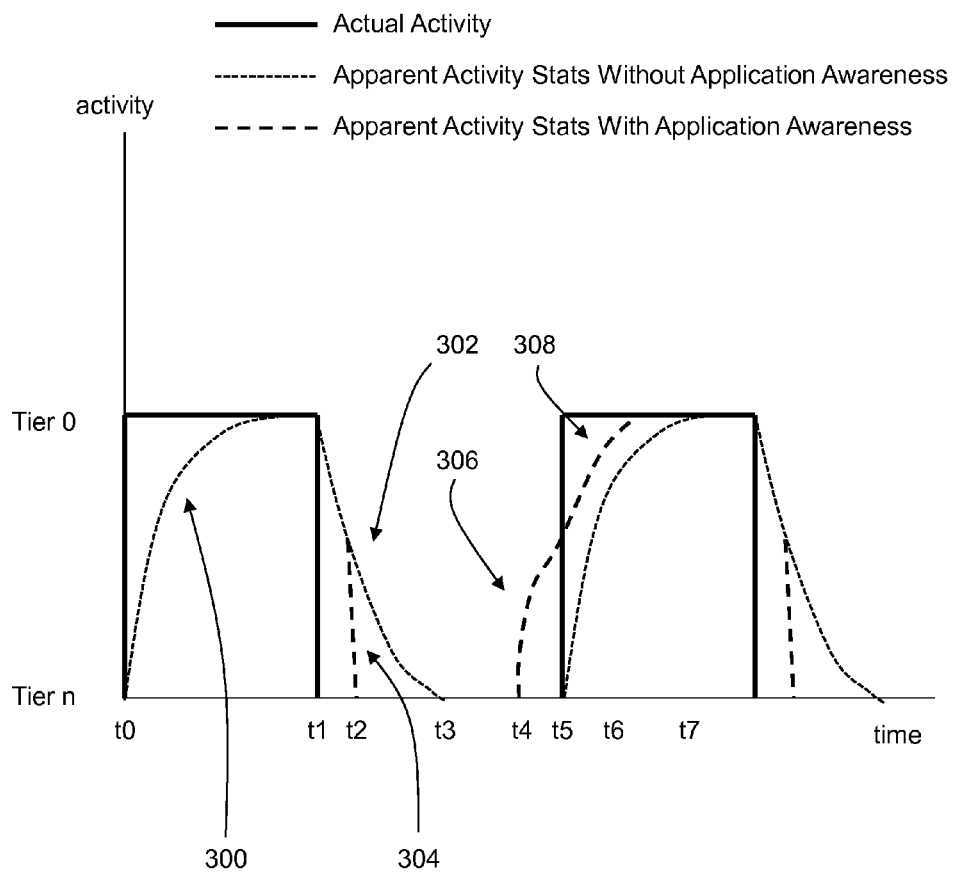
FIGS. 3 and 4 illustrate aspects of the activity statistics generation logic in greater detail.

Referring to FIGS. 1 through 3, data storage tier selection is partly or completely automated based on actual IO activity indicators 200 and application awareness in terms of future application activity indicators 202. IO activity is monitored at the extent level, thereby providing a relative indication of actual activity. Various indicators of the level of IO activity might be used, but for explanatory purposes the indicator may be time since the most recent IO. More recently accessed extents are "hotter" than less recently accessed extents, and the number of accesses in a window of time may also be considered. Typically, the level of activity of an extent is considered relative the levels of activity of other extents in order to determine whether to promote or demote the extent. Consequently, IO activity associated with an extent of data can generally prompt promotion of the extent to a higher tier of storage, and lack of IO activity associated with an extent can prompt demotion of the extent to a lower tier of storage. However, IO activity at the extent level tends to fluctuate so additional controls are utilized to inhibit overly frequent promotion and demotion of data, i.e., "thrashing." For example, growth and decay functions may be employed by activity statistics generation logic 204 to control the rate of change of the IO activity statistics outputted to activity statistics records 206, i.e., the apparent level of activity. The apparent level of activity is utilized by automated storage tiering decision logic 208 to promote and demote extents.

Operation of the growth and decay functions is shown in FIG. 3. At time t0 the actual level of IO activity for an extent increases instantaneously, e.g., from a level of activity relative to that of other extents that would result in promotion from tier n to tier 0 if not for other controls. A simple growth function without application awareness limits the apparent increase in the IO activity statistics for the extent to an exponential increase 300. Similarly, a simple exponential decay function without application awareness limits the apparent decrease in the IO activity statistics for the extent to an exponential decrease 302 when actual IO activity stops at time t1. This advantageously tends to mitigate thrashing. However, data which is not demoted due to the decay function can occupy space on relatively faster tiers of storage for hours after the application associated with the extent has become inactive. Further, when the application again becomes active at time t5 the extent begins being promoted from the slowest tier to which it has been demoted while the application was inactive. Application awareness helps to overcome these problems.

Referring again to FIGS. 1 through 3, the activity and statistics generation logic 204 uses application awareness in terms of future application activity indicators 202 to adjust the apparent level of activity to further enhance performance. As mentioned above, examples of future application activity and inactivity indicators 202 include but are not limited to RDM bind and unbind commands 126, 128, respectively. These commands can be used to prompt changes in apparent activity to help avoid utilizing relatively faster storage for data associated with an inactive application, and also to promote data before it is required by an application. When a future application inactivity indicator is received at time t2 the decay 304 of apparent activity is accelerated. For example, the apparent level of activity may be caused to drop directly to the actual activity level, or the exponential decay may be increased. Consequently, demotion of the data will be prompted sooner and the storage resources of faster tiers are more likely to become available between time t2 and time t3 when they might otherwise be occupied by the inactive data. When an application activity indicator is received at time t4 the apparent level of activity outputted by the activity statistics generation logic 306 is increased even though the level of actual activity has not changed. Consequently, the apparent level of activity is greater than it would have been without application awareness when actual activity begins at time t5. This tends to prompt the promotion of the data to faster tiers of storage before the data is required by the application at time t5, i.e., "pre-heating" the data for anticipated use. The growth function controls the increase 308 in apparent activity after time t5, but note that the data actual activity level is approached by the apparent activity level sooner as a result of pre-heating, i.e., at time t6 rather than at time t7.

The increase in the apparent level of activity due to preheating from time t4 to time t5 may be controlled in various ways. For example, the apparent level of activity may increase instantaneously or gradually, e.g., exponentially. Further, the maximum level of apparent activity prior to the onset of actual activity may be limited as a function of the level of activity recorded when the previous indicator of application inactivity was received at time t2, e.g., capped at that level or some fraction of that level. Consequently, when an application signals an onset of activity, e.g., with a bind command, the storage array begins promoting extents that were active when that application most recently became inactive, and limits the promotion in a manner which corresponds to a level of activity associated with the tier or tiers of storage at which those extents were maintained when that application most recently became inactive.

It is understood that upon becoming active the data processing application may not necessarily utilize the same extents that were utilized in the most recent period of application activity. Moreover, the level of activity of extents may not be the same as it was in the most recent period of application activity. However, preheating extents tends to enhance the chances that the application will not be hampered by performance problems when the application becomes active, and may even enable the use of relatively slower storage devices at the slowest tiers. Further, the use of the application inactivity indicator helps avoid needlessly storing inactive data at faster tiers, potentially for hours, when those storage resources could be better used for data associated with active applications.

Figure 4:
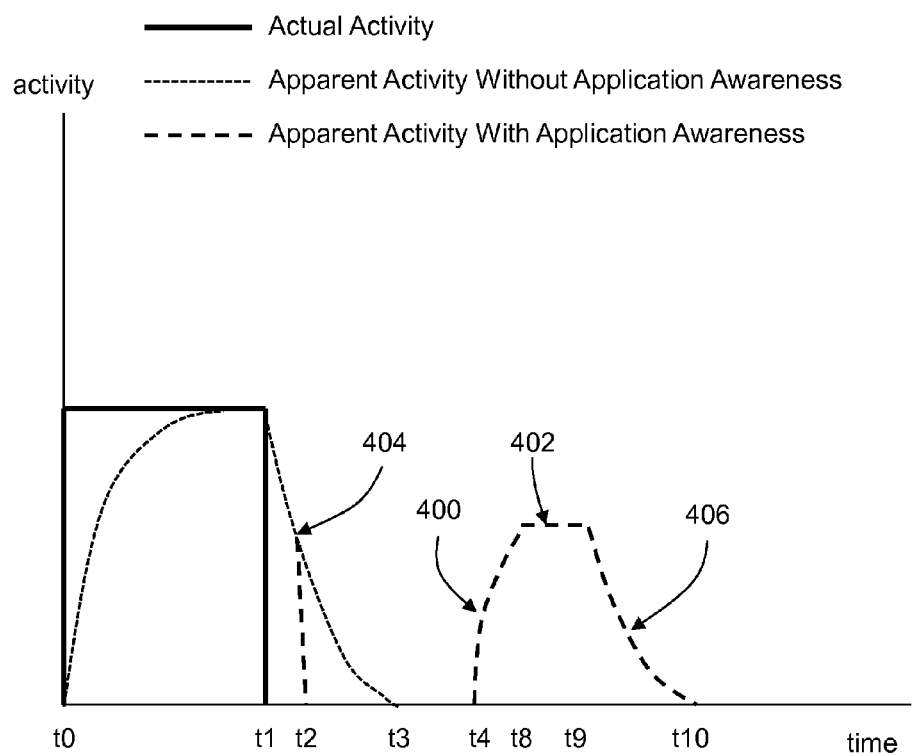

FIG. 4 illustrates a situation where the anticipated actual application activity does not occur. When an indicator of future application activity is received at time t4 the apparent level of activity outputted by the activity statistics generation logic is increased 400. This tends to prompt the promotion of the data to faster tiers of storage by the automated storage tiering decision logic. The apparent level of activity increases exponentially and is limited to a level of activity 402 corresponding to the level of activity 404 observed when the most recent application inactivity indicator was received at time t2. However, because the actual activity level does not increase, the increase of the apparent level of activity is limited to the previously observed level or some fraction thereof. In the absence of the onset of actual activity the apparent level of activity is maintained at this level for a predetermined period of time from time t8 to time t9. The level of apparent activity is then gradually or instantaneously reduced 406 back to the actual level of activity. Consequently, data is not maintained at tiers corresponding to pre-heated levels of activity indefinitely while waiting for the onset of actual activity.

Figure 5:
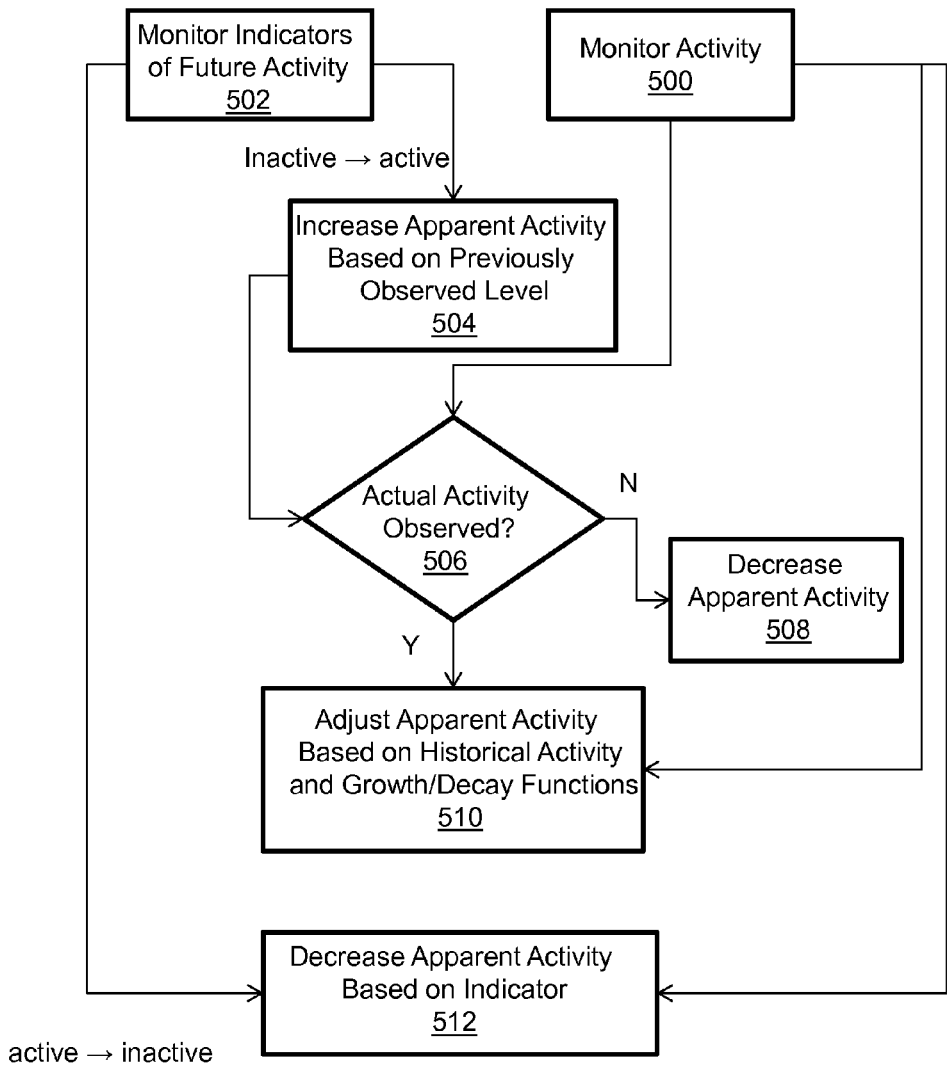
FIG. 5 illustrates a method of automated storage tiering based on actual activity and application awareness.

FIG. 5 is a flow diagram which further illustrates some of the aspects of automated storage tiering based on actual IO activity indicators and future application activity indicators. Both actual IO activity and indicators of future activity are monitored as shown in steps 500, 502, respectively. If a change in future activity status from inactive to active is observed in step 502 then the apparent level of activity is increased as indicated in step 504. For example, the level of apparent activity may be increased rapidly to a level previously observed when the associated application became inactive. If actual activity is not observed as determined at step 506 then apparent activity is decreased as indicated at step 508. For example, if actual activity is not observed after a predetermined period of time then the level of apparent activity may be decreased rapidly or in accordance with a decay function. If actual activity is observed as determined at step 506 then the level of apparent activity is adjusted in step 510 based on monitored activity 500. More particularly, the apparent activity is adjusted based on monitored activity for which changes are controlled by growth and decay functions. If a change in future activity status from active to inactive is observed in step 502 then the apparent level of activity is decreased as indicated in step 512. For example, the level of apparent activity may be decreased rapidly to the actual level of activity based on monitored activity 500.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

While the invention is described through the above exemplary examples, it will be understood by those of ordinary skill in the art that a wide variety of modifications to and variations of the illustrated embodiments may be made without departing from the inventive concepts herein disclosed. Moreover, while the embodiments are described in connection with various illustrative structures, one skilled in the art will recognize that the system may be embodied using a wide variety of specific structures. Accordingly, the invention should not be viewed as limited except by the scope and spirit of the appended claims.

What is claimed is:

1. A method comprising:
in a data storage system including a host which runs a data processing application and a tiered storage array associated with the application,
monitoring data access activity associated with the logical unit of storage;
monitoring at least one indicator of future activity of the application;
calculating an apparent level of data access activity based on the monitored data access activity after application of at least one function that controls rate of change; and
causing data to be moved between tiers of storage based on both the apparent level of data access activity and the indicator of future activity of the application.

2. The method of claim 1 including increasing the apparent level of data access activity to a limit based on a previously observed amount of data access activity in response to the indicator being suggestive of a change of application status from inactive to active.

3. The method of claim 2 including further increasing the apparent level of data access activity beyond the limit in response to an indication of increased data access activity.

4. The method of claim 2 including decreasing the apparent level of data access activity after a predetermined period of time during which data access activity does not increase.

5. The method of claim 1 including decreasing the apparent level of data access activity in response to the indicator being suggestive of a change of application status from active to inactive.

6. A computer program stored on a non-transitory computer-readable medium comprising:
in a data storage system including a host which runs a data processing application and a tiered storage array associated with the application,
logic which monitors data access activity associated with the logical unit of storage;
logic which monitors at least one indicator of future activity of the application;
logic which calculates an apparent level of data access activity based on the monitored data access activity after application of at least one function that controls rate of change; and
logic which causes data to be moved between tiers of storage based on both the apparent level of data access activity and the indicator of future activity of the application.

7. The computer program of claim 6 including logic which increases the apparent level of data access activity to a limit based on a previously observed amount of data access activity in response to the indicator being suggestive of a change of application status from inactive to active.

8. The computer program of claim 7 including logic which further increases the apparent level of data access activity beyond the limit in response to an indication of increased data access activity.

9. The computer program of claim 7 including logic which decreases the apparent level of data access activity after a predetermined period of time during which data access activity does not increase.

10. The computer program of claim 6 including logic which decreases the apparent level of data access activity in response to the indicator being suggestive of a change of application status from active to inactive.

11. Apparatus comprising:
a host device which runs a data processing application;
a tiered storage array associated with the application, the storage array including logic which monitors data access activity associated with the logical unit of storage; logic which monitors at least one indicator of future activity of the application; including logic which calculates an apparent level of data access activity based on the monitored data access activity after application of at least one function that controls rate of change; and logic which causes data to be moved between tiers of storage based on both the apparent level of data access activity and the indicator of future activity of the application.

12. The apparatus of claim 11 including logic which increases the apparent level of data access activity to a limit based on a previously observed amount of data access activity in response to the indicator being suggestive of a change of application status from inactive to active.

13. The apparatus of claim 12 including logic which further increases the apparent level of data access activity beyond the limit in response to an indication of increased data access activity.

14. The apparatus of claim 12 including logic which decreases the apparent level of data access activity after a predetermined period of time during which data access activity does not increase.

15. The apparatus of claim 11 including logic which decreases the apparent level of data access activity in response to the indicator being suggestive of a change of application status from active to inactive.

* * * * *